(12) United States Patent
Kobayashi (10) Patent No.: US 7,295,109 B2
(45) Date of Patent: Nov. 13, 2007

(54) MONITORING SYSTEM

(75) Inventor: Takayuki Kobayashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 241 days.

(21) Appl. No.: 11/134,423

(22) Filed: May 23, 2005

(65) Prior Publication Data
US 2005/0285737 A1    Dec. 29, 2005

(30) Foreign Application Priority Data
May 24, 2004    (JP)    ............... 2004-153889

(51) Int. Cl.
   *G08B 13/00*    (2006.01)
(52) U.S. Cl. ............... 340/541; 340/539.21; 340/552; 340/565
(58) Field of Classification Search ............... 340/541, 340/539.21, 539.25, 545.2, 545.3, 550–554, 340/561, 565, 567; 348/143
See application file for complete search history.

(56) References Cited

U.S. PATENT DOCUMENTS 7,026,924 B2 *   4/2006   Degrauwe et al. .......... 340/523
7,088,236 B2 *   8/2006   Sorensen ............... 340/539.13
2003/0210139 A1 *   11/2003   Brooks et al. ............. 340/531
2005/0055568 A1 *   3/2005   Agrawala et al. ........... 713/200

FOREIGN PATENT DOCUMENTS

JP    H05-176363 A    7/1993

* cited by examiner

*Primary Examiner*—Toan N. Pham
(74) *Attorney, Agent, or Firm*—Global IP Counselors, LLP (57) ABSTRACT

The monitoring system has a monitoring apparatus and an access point that wirelessly communicates with the monitoring apparatus. The monitoring apparatus sends a wireless signal to the access point. The access point generates a Received Signal Strength Indicator of the received wireless signal. The access point checks for an entrance of an intruder between the monitoring apparatus and the access point based on the Received Signal Strength Indicator generated by the access point. The monitoring systems enables accurate detection of an entrance of an intruder using wireless communication technology.

13 Claims, 6 Drawing Sheets

MONITORING SYSTEM

BACKGROUND OF THE INVENTION

1. Field of the Invention

The present invention relates to a monitoring system that detects an indoor intruder and performs other such monitoring.

2. Background Information

Many different indoor monitoring systems that utilize wireless communications technology have been developed. For instance, an unmanned indoor monitoring system shown in Japanese Patent Application Publication H5-176363 takes as a sample a portion of a baseband signal, which is a fraction of the baseband signal divided by an integer. Then, the sample signal is converted into a digital signal, and stored in a memory. This system constantly compares the digital signal of the current period with the digital signal stored in the immediately previous period. When any change is detected, an alarm is activated.

The unmanned indoor monitoring system shown in Japanese Patent Application Publication H5-176363 checks for an intruder by checking for a change in the digital signal from one period to the next. Accordingly, it activates the alarm even when the digital signal changes as a result of something other than an intruder, such as the operation of some kind of electronic device outdoors.

In view of the above, it will be apparent to those skilled in the art from this disclosure that there exists a need for an improved monitoring system that overcomes the problems of the conventional art. This invention addresses this need in the art as well as other needs, which will become apparent to those skilled in the art from this disclosure.

SUMMARY OF THE INVENTION

Because of this problem, it is an object of the present invention to provide a monitoring system with which the presence of an intruder can be detected more accurately by utilizing wireless communications technology.

A monitoring system according to the first aspect of the present invention includes a wireless communication device, and an access point configured to wirelessly communicate with the wireless communication device. One of the wireless communication device and the access point is configured to send a wireless signal to the other of the wireless communication device and the access point. The other of the wireless communication device and the access point is configured to generate a Received Signal Strength Indicator of the received wireless signal. The other of the wireless communication device and the access point is configured to check for an entrance of an intruder between the wireless communication device and the access point based on the Received Signal Strength Indicator generated by the other of the wireless communication device and the access point.

With this arrangement, an intruder is detected based on the fluctuation in the RSSI of received wireless signals in wireless communication between a wireless communication device and the access point. Therefore, since the system is configured to detect an intruder when the fluctuation of the RSSI substantially matches a fluctuation pattern that is observed when an intruder comes in, the detection of an intruder can be performed more accurately, with less likelihood of false detections.

The monitoring system according to the second aspect of the present invention is the monitoring system according to the first aspect of the present invention, in which the wireless communication device includes a monitoring portion that is configured to be activated once the other of the wireless communication device and the access point detects an entrance of an intruder.

With this arrangement, the operation of the indoor monitoring apparatus is commenced upon a detection of an intruder based on the fluctuation of the RSSI. Therefore, the likelihood of performing unnecessary monitoring operation can be reduced. The operation of the monitoring apparatus can be, for instance, image capturing with a camera, audio recording, alarm activation, or the like.

The monitoring system according to the third aspect of the present invention is the monitoring system according to the first aspect of the present invention, in which the wireless communication device is configured to send the wireless signal to the access point, and the access point is configured to check for an entrance of an intruder between the wireless communication device and the access point based on the Received Signal Strength Indicator that is generated from the wireless signal received by the access point.

With this arrangement, the RSSI is generated based on the wireless signal received by the access point with an RSSI circuit or the like, such that the fluctuation of the RSSI can be used to detect an intruder.

The monitoring system according to the fourth aspect of the present invention is the monitoring system according to the third aspect of the present invention, in which the access point is further configured to send a wireless signal to a wireless communication device, and the access point is configured to check for an entrance of an intruder between the wireless communication device and the access point further based on the Received Signal Strength Indicator that is generated from the wireless signal received by the wireless communication device.

With this arrangement, the RSSI is detected from the wireless signal received by the wireless communication device with a RSSI circuit or the like. By using the RSSI from the wireless communication device together with the RSSI from the access point to detect an intruder, the detection of an intruder can be performed at even a higher accuracy.

The monitoring system according to the fifth aspect of the present invention is the monitoring system according to the fourth aspect of the present invention, in which the wireless communication device is further configured to transmit the Received Signal Strength Indicator generated by the wireless communication device to the access point.

If the RSSI generated by the monitoring apparatus is sent to the access point in terms of SLN0 (Signal Level Number 0) or the like, then both the RSSI from the monitoring apparatus and the RSSI from the access point can be centrally managed at the access point, and both of the RSSI from the monitoring apparatus and the RSSI from the access point can be used for detection of an intruder.

The monitoring system according to the sixth aspect of the present invention is the monitoring system according to the first aspect of the present invention, in which the other of the wireless communication device and the access point is configured to store an intruder-origin fluctuation pattern indicating a fluctuation of the Received Signal Strength Indicator to be generated by the other of the wireless communication device and the access point when an intruder enters between the wireless communication device and the access point, and the other of the wireless communication device and the access point is configured to detect an entrance of an intruder when its Received Signal Strength Indicator substantially matches the stored intruder-origin fluctuation pattern.

With this arrangement, the fluctuation of the RSSI typically observed when an intruder enters is stored as a fluctuation pattern. Accordingly, it can be determined that an intruder has entered when the fluctuation pattern substantially matches the fluctuation in the RSSI. Since the operation of the monitoring portion is commenced after the detection is made in this manner, the monitoring portion can be operated more efficiently, only when needed. The term "match" herein refers to an exact match, as well as match with an error within a certain range.

The monitoring system according to the seventh aspect of the present invention is the monitoring system according to the first aspect of the present invention, in which the wireless communication device includes an indoor directional antenna through which the wireless communicate device is configured to communicate with the access point, and the access point includes an indoor directional antenna through which the wireless communicate device is configured to communicate with the wireless communication device.

With this arrangement, it is possible to reduce fluctuations in the RSSI due to indoor and outdoor noises such as those produced by various kinds of electronic device. Also, if the indoor directional antennas are disposed so as to be directed towards each other across an area where an intruder will pass through, the fluctuations in the RSSI caused by an intruder can be discerned more accurately.

The monitoring system according to the eighth aspect of the present invention is the monitoring system according to the second aspect of the present invention, in which the monitoring portion of the wireless communication device is configured to capture images when activated.

With this invention, image capturing is commenced upon the detection of an intruder. Thus, the image capturing can be performed more efficiently.

The monitoring system according to the ninth aspect of the present invention is the monitoring system according to the first aspect of the present invention, in which the other of the wireless communication device and the access point is further configured to send a wireless signal to the one of the wireless communication device and the access point. The one of the wireless communication device and the access point is configured to generate a Received Signal Strength Indicator of the received wireless signal. The other of the wireless communication device and the access point is configured to check for an entrance of an intruder between the wireless communication device and the access point based on the Received Signal Strength Indicators of both of the wireless communication device and the access point.

The monitoring system according to the tenth aspect of the present invention is the monitoring system according to the ninth aspect of the present invention, in which the one of the wireless communication device and the access point is further configured to transmit its Received Signal Strength Indicator to the other of the wireless communication device and the access point together with address information that identifies the one of the wireless communication device and the access point.

A monitoring system according to the eleventh aspect of the present invention includes a wireless communication device having a monitoring portion; and an access point configured to wirelessly communicate with the wireless communication device. The wireless communication device and the access point are configured to send a wireless signal to each other. Each of the wireless communication device and the access point is configured to generate a Received Signal Strength Indicator of the received wireless signal. Each of the wireless communication device and the access point is configured to store an intruder-origin fluctuation pattern indicating a fluctuation of the Received Signal Strength Indicator to be generated when an intruder enters between the wireless communication device and the access point. One of the wireless communication device and the access point is configured to detect an entrance of an intruder between the wireless communication device and the access point when the Received Signal Strength Indicators of the access point substantially matches the intruder-origin fluctuation pattern of the access point and when the Received Signal Strength Indicators of the wireless communication device substantially matches the intruder-origin fluctuation pattern of the wireless communication device. The monitoring portion of the wireless communication device is activated when an entrance of an intruder between the wireless communication device and the access point is detected.

The monitoring system according to the twelfth aspect of the present invention is the monitoring system according to the eleventh aspect of the present invention, in which the wireless communication device is further configured to transmit its intruder-origin fluctuation pattern and the Received Signal Strength Indicator generated by the wireless communication device to the access point, and the access point is configured to check for an entrance of an intruder between the wireless communication device and the access point.

The monitoring system according to the thirteenth aspect of the present invention is the monitoring system according to the twelfth aspect of the present invention, in which the wireless communication device is further configured to transmit its Received Signal Strength Indicator to the access point together with address information that identifies the wireless communication device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment (1) Structure

Figure 1:
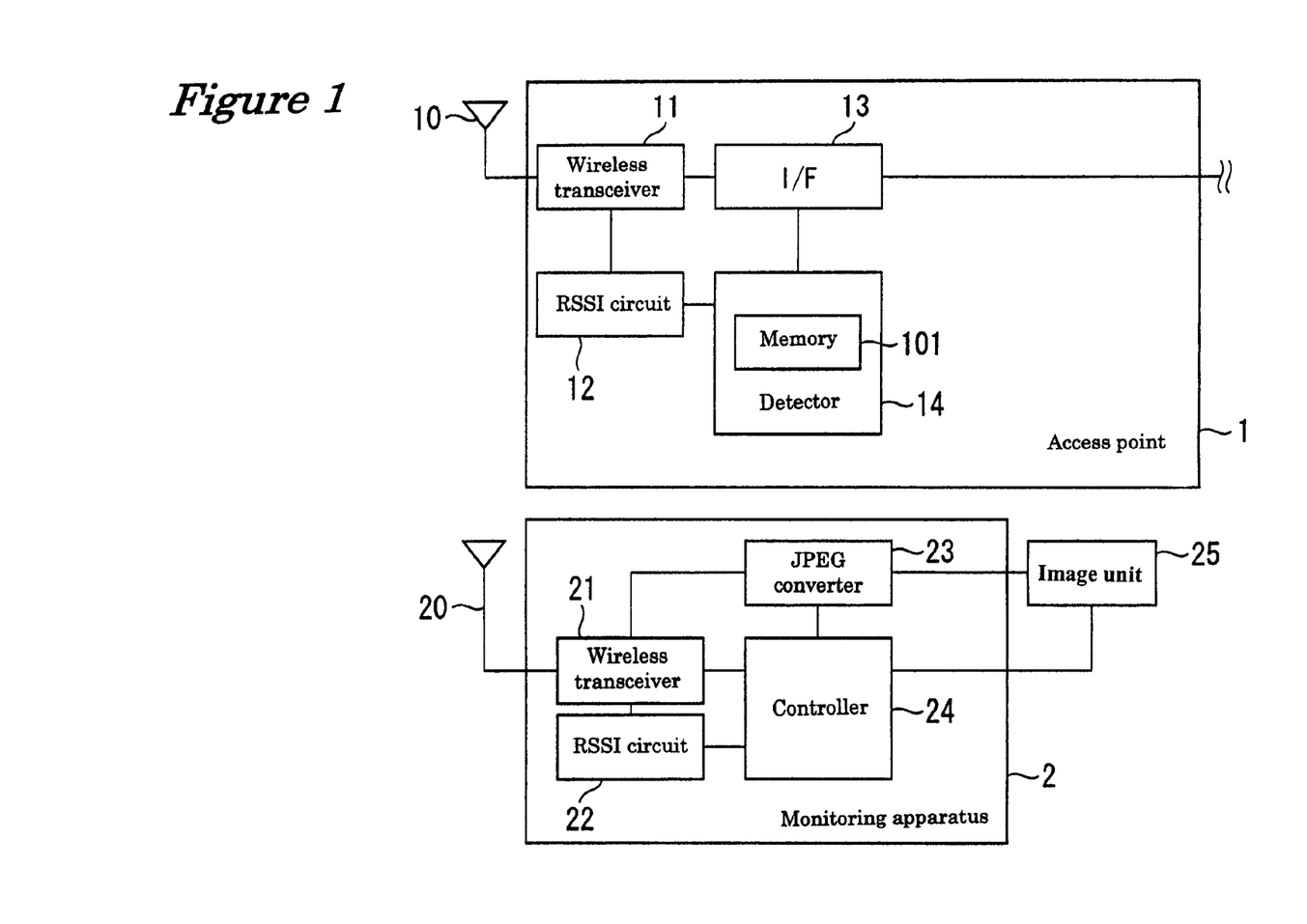
FIG. 1 is a schematic diagram of a wireless monitoring system in accordance with a first embodiment of the present invention.

FIG. 1 is a simplified structural diagram of a wireless monitoring system in accordance with a preferred embodiment of the present invention. This system includes an access point 1 and a monitoring apparatus 2. Wireless bi-directional communication is performed between the access point 1 and the monitoring apparatus 2 according to IEEE 802.11b standards, Bluetooth standards, or the like. The standard by which the wireless communication is performed between the access point 1 and the monitoring apparatus 2 is not limited to these standards, and any known wireless communication suited for the purpose of the present invention can be employed. Furthermore, the access point 1 and the monitoring apparatus 2 transmit each other wireless signals, based on which each of the access point 1 and the monitoring apparatus 2 generates an RSSI (Received Signal-Strength Indicator).

Access Point 1

The access point 1 has an antenna 10, a wireless transceiver 11, an RSSI (Received Signal-Strength Indicator) circuit 12, an interface (I/F) 13, and a detector 14. The antenna 10 receives signals transmitted wirelessly from the monitoring apparatus 2, and also wirelessly transmits to the monitoring apparatus 2 data that are outputted from the detector 14, a wired LAN (not shown), or other components connected to the wireless transceiver 11 via the I/F 13.

The wireless transceiver 11 performs the processing necessary for data transmission and reception between the monitoring apparatus 2 and the access point 1 (or a wired LAN or the like connected to the I/F 13), such as the modulation and demodulation of received signals and signals to be transmitted, and conversion of RF signals into IF signals. The wireless transceiver 11 also transmits a wireless signal to the monitoring apparatus 2, based on which the monitoring apparatus 2 creates an RSSI as described below.

The RSSI circuit 12 outputs to the detector 14 the RSSI (Received Signal Strength Indicator) of a signal received by the access point 1, on a real time basis as the signal is received from the monitoring apparatus 2. This RSSI outputted on a real time basis indicates a change in the RSSI over time. Hereinafter, this change over time will be called a "fluctuation." Also, the RSSI outputted from the RSSI circuit 12 will be called the "AP-side RSSI."

The detector 14 includes a microcomputer or the like, and has a memory 101. The detector 14 is operatively connected to the I/F 13 and the RSSI circuit 12, such that the detector 14 can transmit and receive data thereto and therefrom as needed. In this embodiment, the detector 14 performs the detection processing shown in FIG. 4. The AP-side RSSI fluctuation pattern and the M-side fluctuation pattern (which are discussed below) are stored in this memory 101.

Monitoring Apparatus 2

Figure 5:
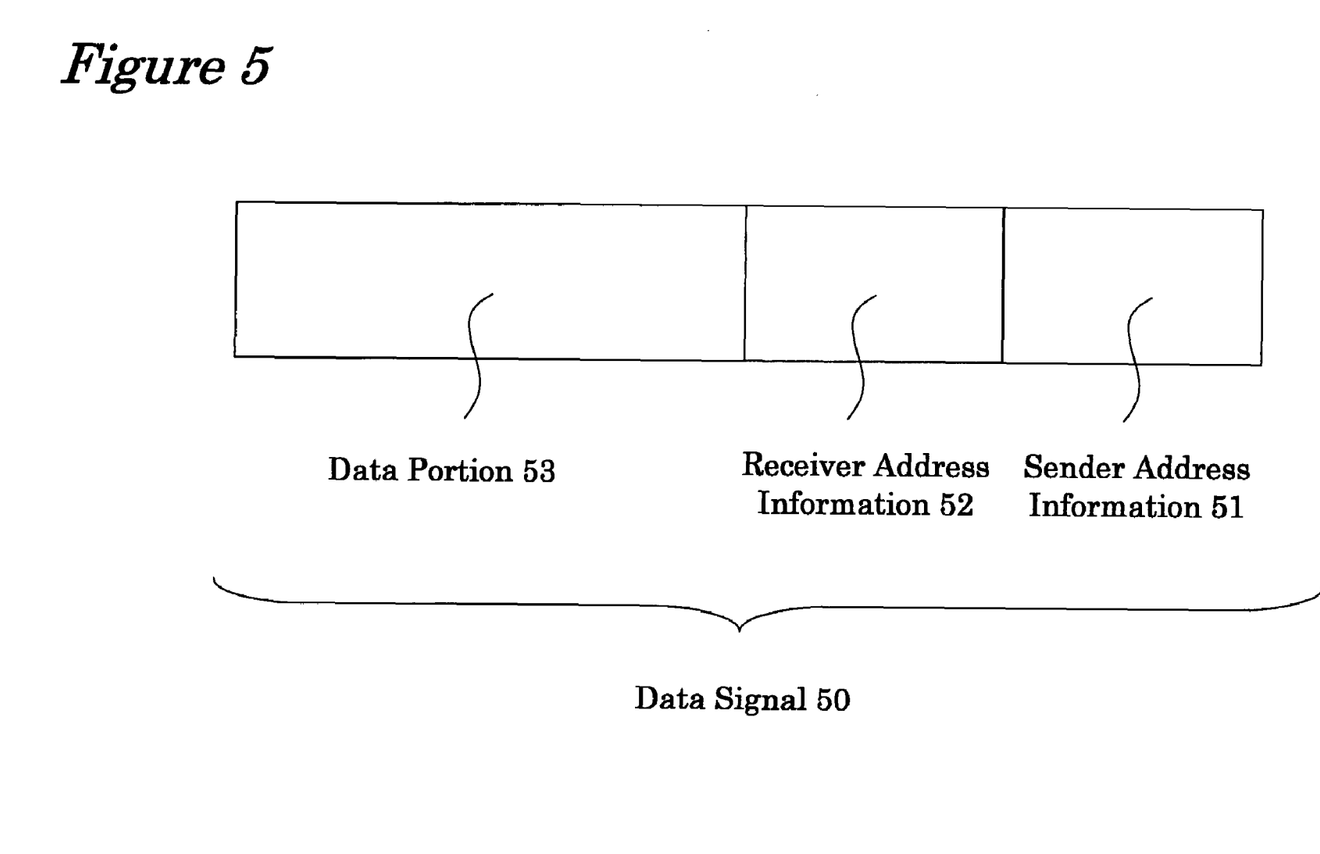
FIG. 5 is an example of the data signal to be transmitted in the wireless monitoring system in accordance with the embodiments of the present invention.

The monitoring apparatus (an example of the wireless communication device) 2 has an antenna 20, a wireless transceiver 21, an RSSI circuit 22, a JPEG converter 23, and a controller 24, which constitute a communication portion, and an image unit (an example of the image capturing portion) 25 that is operatively connected to the communication portion. The antenna 20 and the wireless transceiver 21 are constituted in the same manner as the antenna 10 and the wireless transceiver 11 in this embodiment. Therefore, data outputted from the controller 24, and JPEG image data outputted from the JPEG converter 23 are wirelessly transmitted to the access point 1, while data wirelessly transmitted from the access point 1 is received and outputted to the controller 24 and so forth. The wireless transceiver 21 also transmits a wireless signal to the access point 1, based on which the RSSI circuit 12 of the access point 1 creates an AP-side RSSI as described below. Furthermore, the wireless transceiver 21 attaches address information of the monitoring apparatus 2 to the data generated by the RSSI circuit 22, the JPEG converter 23, and the controller 24, when such data are to be sent to the access point 1. FIG. 5 shows an example of a data signal 50 to be transmitted from the wireless transceiver 21 to the wireless transceiver 11. The data signal 50 includes a sender address information 51, a receiver address information 52, and a data portion 53 such as JPEG image data. The address information is, for example, a 3-digit MAC (media access control) address in this embodiment. However, other address information may be used in lieu of a MAC address.

The RSSI circuit 22 is constituted in the same manner as the RSSI circuit 12, and outputs to the controller 24 the RSSI (Received Signal Strength Indicator) of a signal received by the monitoring apparatus 2 on a real time basis as the signal is received. The RSSI outputted from the RSSI circuit 22 will hereinafter be called the "M-side RSSI." The controller 24 takes the M-side RSSI outputted from the RSSI circuit 22 and wirelessly transmits it to the access point 1 through the wireless transceiver 21 and the antenna 20 in terms of SLN0 (Signal Level Number 0) or the like. Such M-side RSSI can be transmitted to the access point 1 as a data signal 50 shown in FIG. 5, in which the data portion 53 contains the M-side RSSI in terms of SLN0.

The image unit 25 begins image capturing under the control of the controller 24, and the video image thus taken is outputted to the JPEG converter 23. The JPEG converter 23 converts the video image outputted from the image unit 25 into JPEG image data and outputs this data to the wireless transceiver 11. Monitoring devices other than the image unit 25, such as a directional microphone, may be connected to the wireless transceiver 21 and the controller 24, and these devices are operated under the control of the controller 24 so that the necessary data (such as audio data) is wirelessly transmitted to the access point 1. Also, although the images taken by the image unit 25 are converted into the JPEG format in this embodiment, the monitoring apparatus 2 may be configured to convert the video image into any other digital image format.

Figure 2:
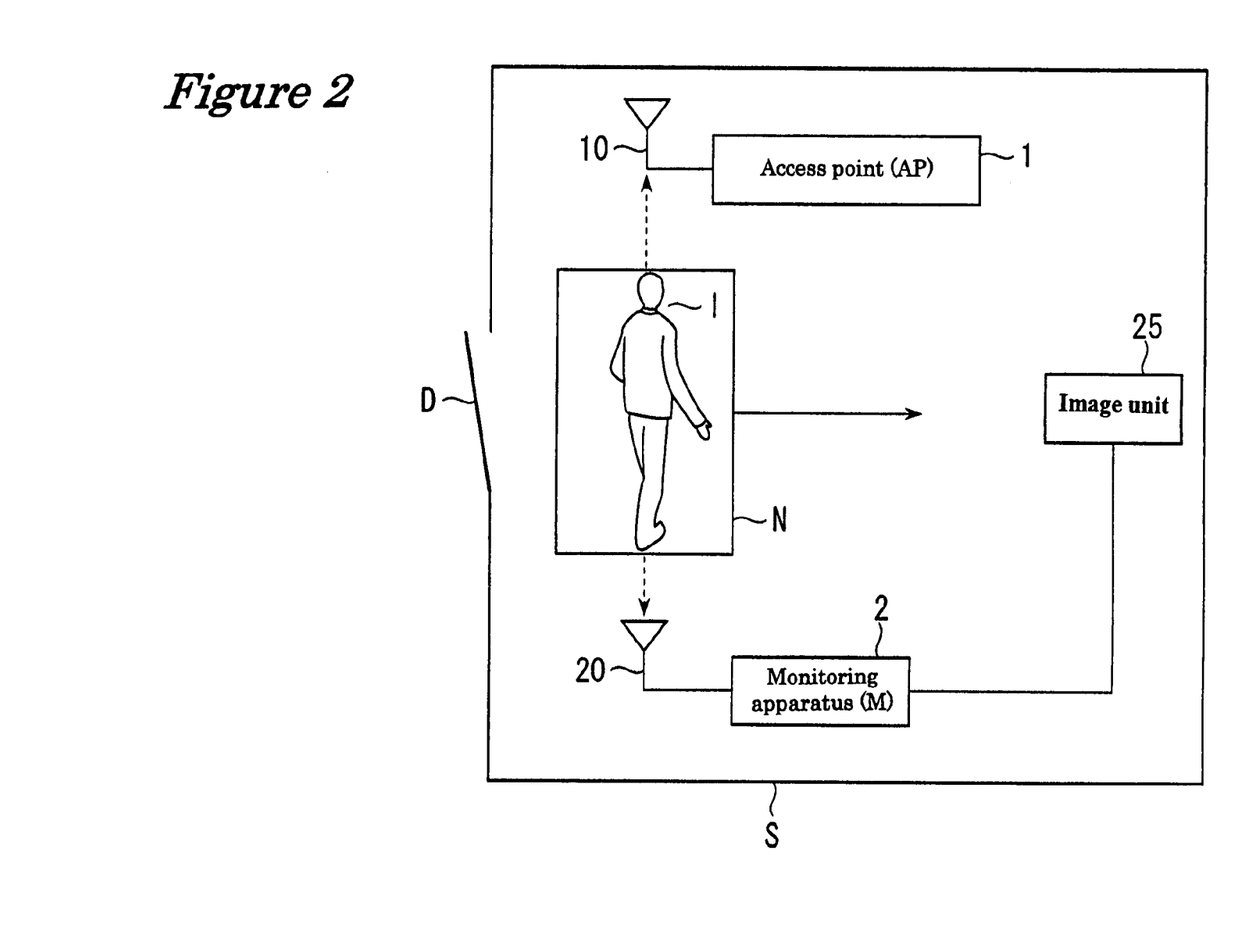
FIG. 2 is an example of how the wireless monitoring system in accordance with the first embodiment of the present invention is installed.

As shown in FIG. 2, the access point 1 and the monitoring apparatus 2 are installed in an interior space S at locations that allow bi-directional communication therebetween. Furthermore, the access point 1 and the monitoring apparatus 2 are installed across from each other so that the location where an intruder I is expected to pass by when entering the interior space S is approximately midway therebetween. In the case shown in FIG. 2, it is expected that the intruder I enters the interior space S through a door D, and passes through an area N near the door D. Accordingly, the access point 1 and monitoring apparatus 2 are installed so as to flank the area N near the door D. The image unit 25, on the other hand, is preferably installed somewhere that allows the image unit 25 to capture substantially the entire interior space S. Although FIG. 2 shows only one image unit 25, two or more image units 25 can be installed in the interior space S. In such case, all of the image units can be configured to communicate with the same monitoring apparatus 2.

When there is a change in the AP-side RSSI and the M-side RSSI, this wireless monitoring system executes the detection processing described below and respectively compares the changes in the AP-side RSSI and the M-side RSSI with the AP-side RSSI fluctuation pattern and M-side RSSI fluctuation pattern that are stored in the memory 101 in advance. Then, the controller 24 activates the image unit 25 depending on the results of this comparison.

Figure 3:
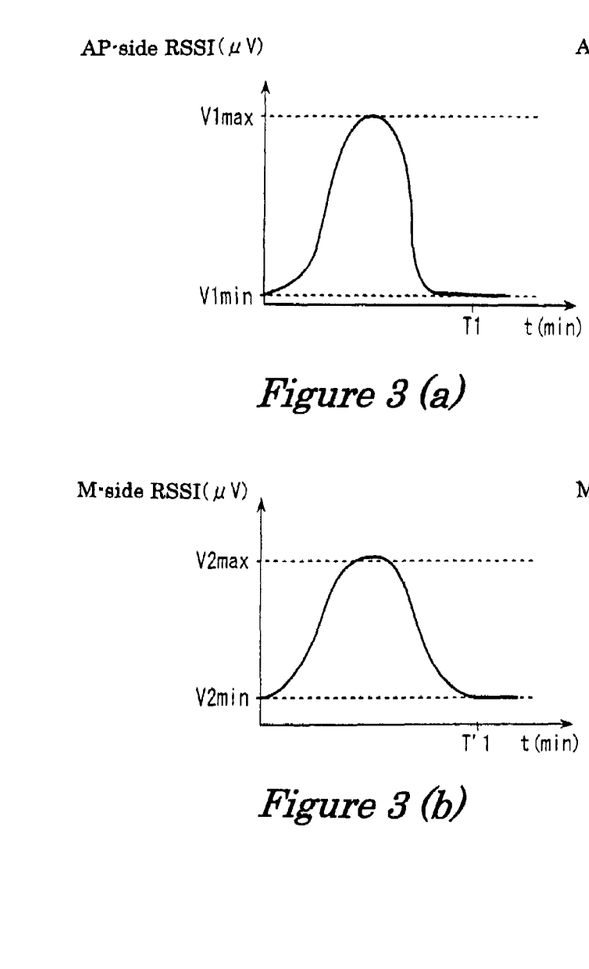
FIGS. 3(a)-(d) are examples of AP-side RSSI fluctuation patterns and M-side RSSI fluctuation patterns.

FIG. 3*a* is an example of the AP-side RSSI fluctuation pattern. This pattern shows how the AP-side RSSI typically fluctuates when the intruder I passes through the area N near the door D, and may be obtained ahead of time by having a person walk through the area N and measuring the AP-side RSSI. FIG. 3*b* is an example of the M-side RSSI fluctuation pattern, and similarly shows how the M-side RSSI typically fluctuates when the intruder I passes through the area N near the door D. Again, this M-side RSSI fluctuation pattern may be obtained ahead of time by having a person walk through the area N and measuring the M-side RSSI. The patterns shown in FIG. 3 are nothing more than examples. Actual AP-side RSSI fluctuation pattern and M-side RSSI fluctuation pattern may vary depending on the wireless communication environment inside and outside the interior space S.

Here, the antennas 10 and 20 are preferably constituted by known indoor directional antennas so that they will not be susceptible to noises due to, for example, such operations of electrical devices outside of the interior space S, and that RSSI fluctuation patterns reflects only the entrance of the intruder I through the area N near the door D. This arrangement increases the accuracy of video commencement prompted by the entry of the intruder I, and prevents unnecessary image capturing effectively. Also, the entry by the intruder I can be discerned more sensitively if the antennas 10 and 20 are installed so as to be pointed in directions that traverse the area N near the door D.

(2) Detection Processing

Figure 4:
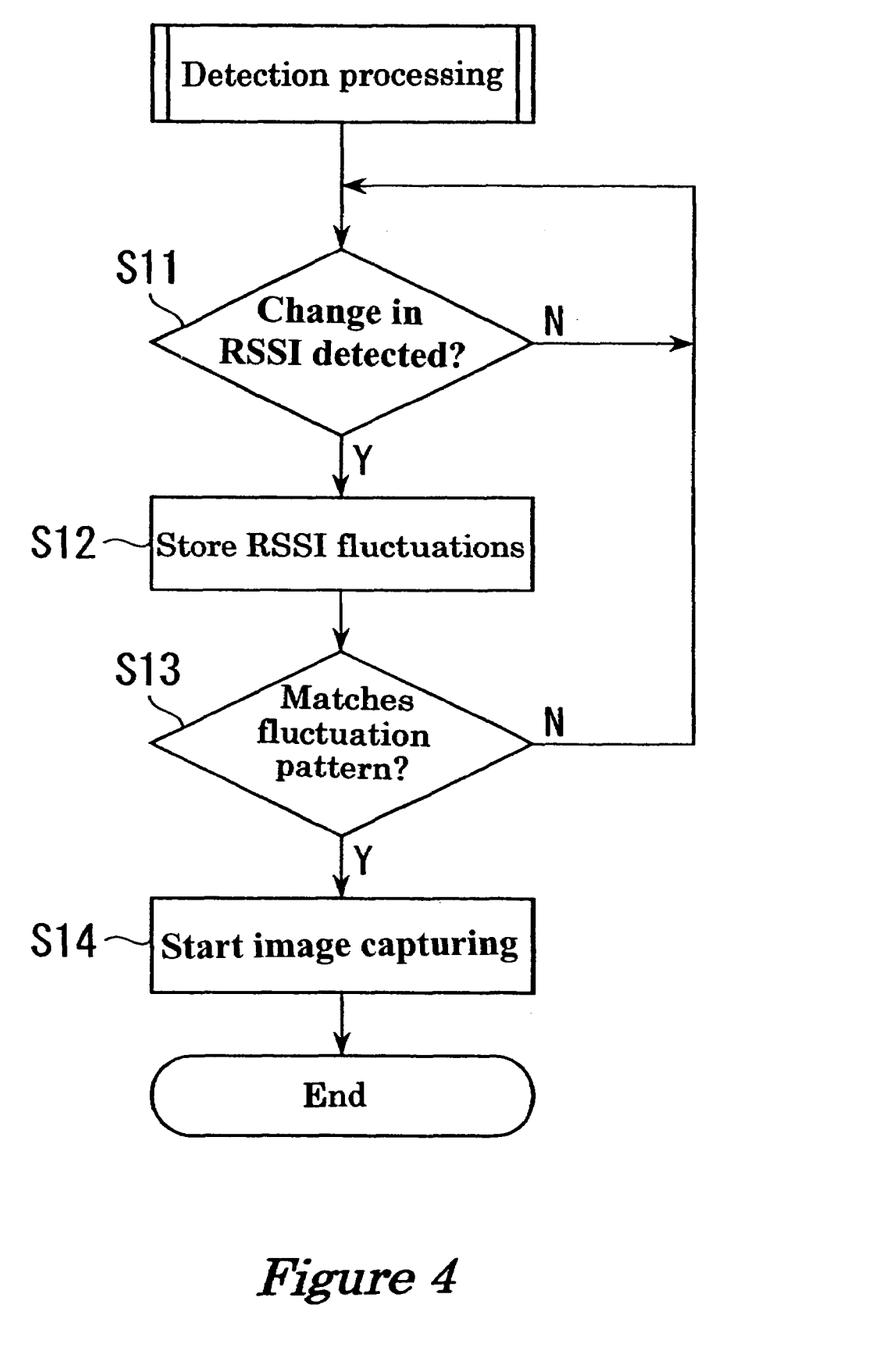
FIG. 4 is a flowchart of the detection processing in accordance with the first embodiment of the present invention.

The flow of detection processing will now be described with reference to the flowchart shown in FIG. 4. This detection processing starts at the start of the operation of the access point 1 and the monitoring apparatus 2 in this embodiment. However, the wireless monitoring system may be configured to start the detection processing at any other designated time or at a time that is manually inputted by an operator.

In step (hereinafter S) S11, the detector 14 detects a change in the RSSI of the wireless monitoring system due to any noise source, such as the entry of the intruder I. If there is a change in the RSSI, the system proceeds to S12. In this embodiment, as an example, the detector 14 determines that a noise has occurred when the AP-side RSSI exceeds a predetermined threshold value V min. Although the threshold value for S11 is the minimum value $V1_{min}$ shown in FIG. 3(*a*) in this embodiment, the threshold value can be any desired value. When the AP-side RSSI exceeds this value, the system moves on to S12. Otherwise, the system keeps monitoring the AP-side RSSI.

In S12, the detector 14 monitors fluctuations in the AP-side RSSI and M-side RSSI until the times T1 and T'1 elapse. Then, the detector 14 stores these fluctuations in the memory 101.

In S13, the detector 14 determines whether or not an intruder I has entered based on whether or not the AP-side RSSI fluctuation stored in S12 matches the pre-stored AP-side RSSI fluctuation pattern, and whether the M-side RSSI fluctuation stored in S12 matches the pre-stored M-side RSSI fluctuation pattern. The match herein may be a perfect match, or may include an error within a specific range. For instance, the controller 24 may be configured to find a match based on the duration during which or the frequency at which the value of the AP-side RSSI fluctuation detected in S12 is between the $V1_{min}$ and $V1_{max}$ shown in FIG. 3(*a*). If there is a match, in other words when the AP-side RSSI fluctuation stored in S12 matches the pre-stored AP-side RSSI fluctuation pattern, and when the M-side RSSI fluctuation stored in S12 matches the pre-stored M-side RSSI fluctuation pattern, it is determined that an intruder I has entered, and the system proceeds to S14. If there is no match, it is determined that there has been no entry of an intruder, and the system returns to S11.

In S14, the detector 14 wirelessly transmits a signal to the monitoring apparatus 2 indicating that an intruder has been detected. The controller 24 then activates the image unit 25 and starts capturing images upon the receipt of this signal. The images captured by the image unit 25 are converted in the JPEG format, and transmitted to other wireless devices as a data signal 50 that has JPEG data in the data portion 53. The controller 24 may also be configured to activate other devices upon the receipt of the signal indicating that an intruder has been detected. For instance, an alarm may be set off or a microphone activated may be activated base on this signal.

Other Embodiments (A) The wireless monitoring system may be configured to store in the memory 101 AP-side and M-side RSSI fluctuation patterns that reflect typical noise sources other than the entry of an intruder I, such as opening the door D or turning on or off the lights in the interior space S. In this case, the detector 14 determines in S13 if any of these non-intruder-origin fluctuation patterns matches AP-side and M-side RSSI fluctuations. If the AP-side and M-side RSSI fluctuations match the pre-stored non-intruder-origin fluctuation patterns, the system returns from S13 to S11 in the above-mentioned detection processing, and the image capturing is not commenced.

For example, upon installation of the wireless monitoring system, the user can open the door D to create the AP-side and M-side RSSI fluctuations patterns (which are, for example, as shown in FIGS. 3(*c*) and 3(*d*)), and store these AP-side and M-side RSSI fluctuations patterns in the memory 101. In this manner, unnecessary capturing of images can be prevented from being started when the RSSI fluctuations are due to typical non-intruder-origin noise sources.

(B) Although the determination in S11 is made by detecting a change in the AP-side RSSI in the first embodiment, the manner of determination is not limited to that in S11 of the above detection processing of the first embodiment. For example, the determination in S11 may alternatively be made based on the M-side RSSI. In this case, the M-side RSSI is transmitted from the monitoring apparatus 2 to the access point 1 in terms of SLN0 (Signal Level Number 0) in a data signal such as the data signal 50 shown in FIG. 5. Then, the detector 14 determines whether or not this M-side RSSI has exceeded a threshold value $V2_{min}$ that has been set as desired.

Alternatively, the occurrence of a noise may be determined according to whether or not the AP-side RSSI and/or the M-side RSSI has exceeded a specific threshold value.

(C) In the detection processing of the first embodiment, both of the AP-side RSSI and M-side RSSI are monitored, and the determination of whether the noise is due to an intruder in S13 is based on whether the AP-side RSSI fluctuation matches the pre-stored AP-side RSSI fluctuation pattern, as well as whether the M-side RSSI fluctuation matches the pre-stored M-side RSSI fluctuation pattern. However, the wireless monitoring system of the present invention may be configured to monitor only the AP-side RSSI fluctuations or the M-side RSSI fluctuations, and the determination that an intruder has entered may be made when the AP-side RSSI fluctuation matches the AP-side RSSI fluctuation pattern, or when the M-side RSSI fluctuation matches the M-side RSSI fluctuation pattern match in S13. It is preferable, however, to monitor both the AP-side RSSI fluctuations and the M-side RSSI fluctuations as discussed above, because this allows more accurate determination of whether or not an intruder I has entered.

Figure 6:
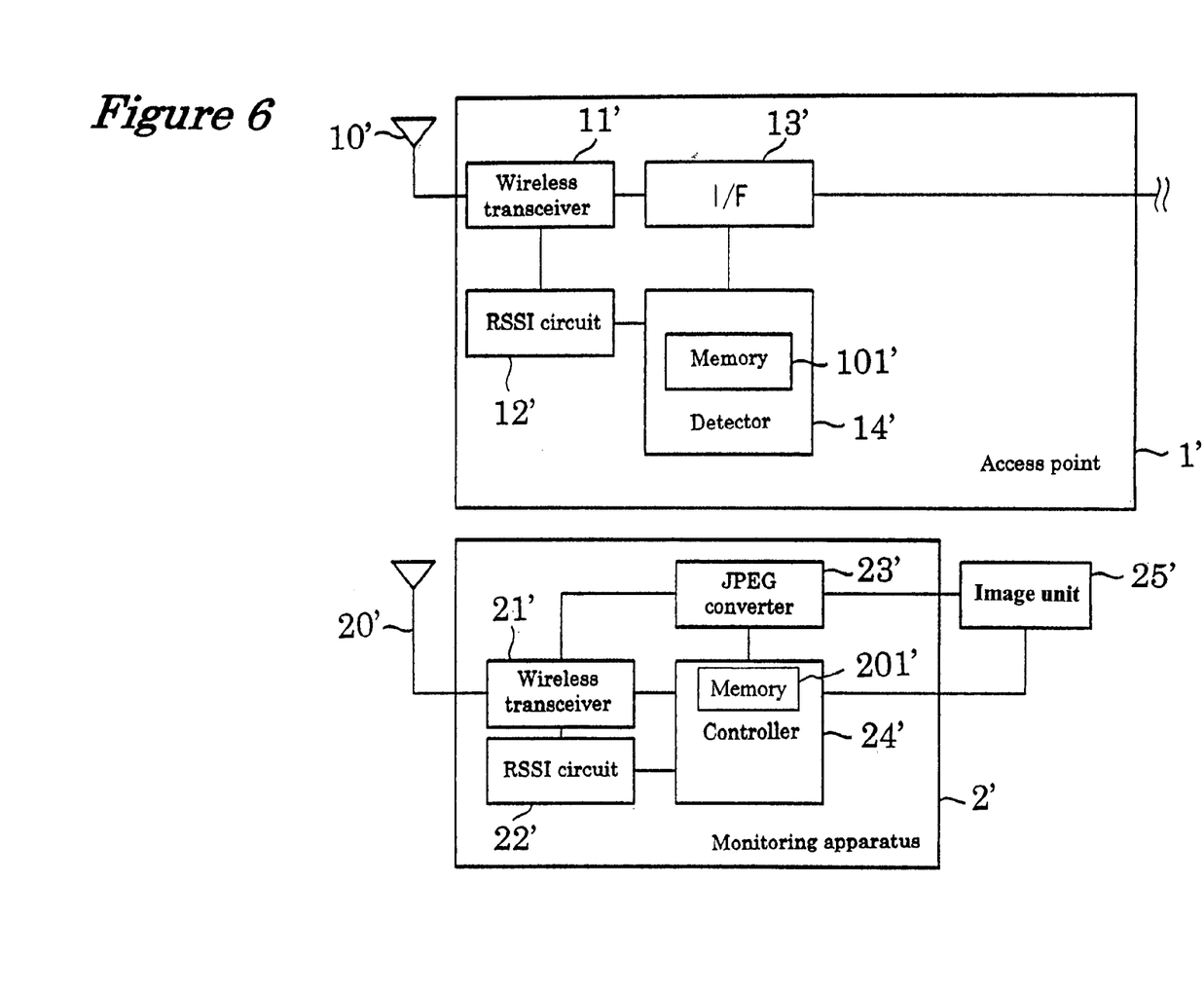
FIG. 6 is a schematic diagram of a wireless monitoring system in accordance with another embodiment of the present invention.

(D) Although in the first embodiment, it is the detector 14 of the access point 1 that makes determinations in S11 and in S13 in the first embodiment, the wireless monitoring system of the present invention may be alternatively configured such that the controller 24' of the monitoring apparatus 2' makes these determinations. In this case, as shown in FIG. 6, the controller 24' stores AP-side and M-side RSSI fluctuation patterns as shown in FIGS. 3(a) and 3(b) in its memory 201'. The controller 24' makes the determination in S11 based on, for example, the M-side RSSI fluctuation. AP-side RSSI fluctuation is sent from the access point 1' to the monitoring apparatus 2'. The controller 24' further makes the determination in S13 by comparing, for example, the M-side RSSI fluctuation with the pre-stored M-side RSSI fluctuation pattern, and the AP-side RSSI fluctuation with the pre-stored AP-side RSSI fluctuation pattern.

With the present invention, an intruder is detected according to a temporal fluctuation in the RSSI of a signal in the communication between an access point and a monitoring apparatus such as a wireless communication handset. As a result, intruder detection can be performed more accurately, with fewer occurrences of false detections.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-153889. The entire disclosure of Japanese Patent Application No. 2004-153889 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A monitoring system comprising
a wireless communication device; and
an access point configured to wirelessly communicate with the wireless communication device,
one of the wireless communication device and the access point being configured to send a wireless signal to the other of the wireless communication device and the access point,
the other of the wireless communication device and the access point being configured to generate a Received Signal Strength Indicator of the received wireless signal, and
the other of the wireless communication device and the access point being configured to check for an entrance of an intruder based on an intruder-origin fluctuation pattern indicating a fluctuation of the Received Signal Strength Indicator to be generated when an intruder enters between the wireless communication device and the access point.

2. The monitoring system according to claim 1, wherein the wireless communication device includes a monitoring portion that is configured to be activated once the other of the wireless communication device and the access point detects an entrance of an intruder.

3. The monitoring system according to claim 2, wherein the monitoring portion of the wireless communication device is configured to capture images when activated.

4. The monitoring system according to claim 1, wherein the wireless communication device is configured to send the wireless signal to the access point, and
the access point is configured to check for an entrance of an intruder between the wireless communication device and the access point based on the Received Signal Strength Indicator that is generated from the wireless signal received by the access point.

5. The monitoring system according to claim 4, wherein the access point is further configured to send a wireless signal to a wireless communication device, and
the access point is configured to check for an entrance of an intruder between the wireless communication device and the access point further based on the Received Signal Strength Indicator that is generated from the wireless signal received by the wireless communication device.

6. The monitoring system according to claim 5, wherein the wireless communication device is further configured to transmit the Received Signal Strength Indicator generated by the wireless communication device to the access point.

7. The monitoring system according to claim 1, wherein
the wireless communication device includes an indoor directional antenna through which the wireless communicate device is configured to communicate with the access point, and
the access point includes an indoor directional antenna through which the wireless communicate device is configured to communicate with the wireless communication device.

8. The monitoring system according to claim 1, wherein
the other of the wireless communication device and the access point is further configured to send a wireless signal to the one of the wireless communication device and the access point,
the one of the wireless communication device and the access point is configured to generate a Received Signal Strength Indicator of the received wireless signal, and
the other of the wireless communication device and the access point is configured to check for an entrance of an intruder between the wireless communication device and the access point based on the Received Signal Strength Indicators of both of the wireless communication device and the access point.

9. The monitoring system according to claim 8, wherein
the one of the wireless communication device and the access point is further configured to transmit its Received Signal Strength Indicator to the other of the wireless communication device and the access point together with address information that identifies the one of the wireless communication device and the access point.

10. A monitoring system comprising:
a wireless communication device; and
an access point configured to wirelessly communicate with the wireless communication device,
one of the wireless communication device and the access point being configured to send a wireless signal to the other of the wireless communication device and the access point,
the other of the wireless communication device and the access point being configured to generate a Received Signal Strength Indicator of the received wireless signal,
the other of the wireless communication device and the access point being configured to store an intruder-origin fluctuation pattern indicating a fluctuation of the Received Signal Strength Indicator to be generated by the other of the wireless communication device and the access point when an intruder enters between the wireless communication device and the access point, and
the other of the wireless communication device and the access point being configured to check for an entrance of an intruder between the wireless communication device and the access point based on the Received Signal Strength Indicator generated by the other of the wireless communication device and the access point by detecting the entrance of the intruder when its Received Signal Strength Indicator substantially matches the stored intruder-origin fluctuation pattern.

11. A monitoring system comprising
a wireless communication device having a monitoring portion; and
an access point configured to wirelessly communicate with the wireless communication device,
wherein
the wireless communication device and the access point are configured to send a wireless signal to each other,
each of the wireless communication device and the access point is configured to generate a Received Signal Strength Indicator of the received wireless signal,
each of the wireless communication device and the access point is configured to store an intruder-origin fluctuation pattern indicating a fluctuation of the Received Signal Strength Indicator to be generated when an intruder enters between the wireless communication device and the access point,
one of the wireless communication device and the access point is configured to detect an entrance of an intruder between the wireless communication device and the access point when the Received Signal Strength Indicators of the access point substantially matches the intruder-origin fluctuation pattern of the access point and when the Received Signal Strength Indicators of the wireless communication device substantially matches the intruder-origin fluctuation pattern of the wireless communication device, and
the monitoring portion of the wireless communication device is activated when an entrance of an intruder between the wireless communication device and the access point is detected.

12. The monitoring system according to claim 11, wherein
the wireless communication device is further configured to transmit its intruder-origin fluctuation pattern and the Received Signal Strength Indicator generated by the wireless communication device to the access point, and
the access point is configured to cheek for an entrance of an intruder between the wireless communication device and the access point.

13. The monitoring system according to claim 12, wherein
the wireless communication device is further configured to transmit its Received Signal Strength Indicator to the access point together with address information that identifies the wireless communication device.

* * * * *